(12) United States Patent
Kienzle

(10) Patent No.: US 8,995,772 B2
(45) Date of Patent: Mar. 31, 2015

(54) REAL-TIME FACE DETECTION USING PIXEL PAIRS

(71) Applicant: Microsoft Corporation, Redmond, WA (US)

(72) Inventor: Wolf Kienzle, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 13/673,250

(22) Filed: Nov. 9, 2012

(65) Prior Publication Data

US 2014/0133758 A1 May 15, 2014

(51) Int. Cl.
*G06K 9/00* (2006.01)
*G06K 9/68* (2006.01)
*G06K 9/62* (2006.01)
*G06K 9/46* (2006.01)

(52) U.S. Cl.
CPC .......... *G06K 9/6267* (2013.01); *G06K 9/00288* (2013.01); *G06K 9/4614* (2013.01); *G06K 9/6257* (2013.01)
USPC ............................ 382/195; 382/118; 382/227

(58) Field of Classification Search
CPC ............ G06K 9/6256; G06K 9/00228; G06K 9/00248; G06K 9/626; G06K 9/00234; G06K 9/6292; G06K 9/3233; G06K 9/4609; G06K 9/6231; G06K 9/00288; G06K 9/46; G06K 9/6257; G06K 9/6269; G06K 9/6282; G06K 9/6857; G06K 9/62; G06K 9/00; G06K 9/6267; G06F 17/30247; G06T 2207/20081; G06T 2207/30201; G06T 3/0093; G06T 7/0012; H04N 7/18

USPC ......... 382/195, 206, 190, 155, 162, 168, 169, 382/17, 181, 201, 219, 224, 225, 227, 237, 382/298, 118; 703/1; 706/15; 704/1; 700/2; 345/1; 348/3
See application file for complete search history.

(56) References Cited

U.S. PATENT DOCUMENTS

| | | | |
|---|---|---|---|
| 7,099,510 B2 | 8/2006 | Jones et al. | |
| 7,263,220 B2 * | 8/2007 | Crandall et al. | 382/165 |
| 7,274,832 B2 | 9/2007 | Nicponski | |
| 7,324,671 B2 * | 1/2008 | Li et al. | 382/118 |
| 7,362,368 B2 | 4/2008 | Steinberg et al. | |
| 7,548,637 B2 * | 6/2009 | Xiong et al. | 382/118 |
| 7,844,085 B2 | 11/2010 | Lu et al. | |
| 8,045,798 B2 * | 10/2011 | Blessan et al. | 382/173 |

(Continued)

OTHER PUBLICATIONS

"International Search Report & Written Opinion for PCT Patent Application No. PCT/US2013/069355", Mailed Date: Feb. 5, 2014, Filed Date: Nov. 9, 2013, 12 Pages.

(Continued)

*Primary Examiner* — Sheela Chawan
(74) *Attorney, Agent, or Firm* — Miia Sula; Judy Yee; Micky Minhas

(57) ABSTRACT

The subject disclosure is directed towards a face detection technology in which image data is classified as being a non-face image or a face image. Image data is processed into an image pyramid. Features, comprising pixel pairs of the image pyramid, are provided to stages of a cascading classifier to remove sub-window candidates that are classified as non-face sub-windows within each stage. The face detection technology continues with one or more subsequent stages to output a result as to whether the image contains a face.

20 Claims, 5 Drawing Sheets

(56) References Cited

U.S. PATENT DOCUMENTS

| | | | |
|---|---|---|---|
| 8,055,029 B2 | 11/2011 | Petrescu et al. | |
| 8,103,058 B2* | 1/2012 | Niskanen et al. | 382/103 |
| 8,295,556 B2* | 10/2012 | Ohtani et al. | 382/118 |
| 8,472,745 B2* | 6/2013 | Kameyama | 382/260 |
| 8,538,171 B2* | 9/2013 | Juza et al. | 382/224 |
| 2009/0161912 A1* | 6/2009 | Yatom et al. | 382/103 |
| 2011/0200270 A1* | 8/2011 | Kameyama | 382/260 |

OTHER PUBLICATIONS

Huang, Chang, et al., "Learning Sparse Features in Granular Space for Multi-View Face Detection", In 7th International Conference on Automatic Face and Gesture Recognition, Apr. 2, 2006, pp. 401-406.

Zhang, Cha, et al., "A Survey of Recent Advances in Face Detection", In Microsoft Technical Report, MSR-TR-2010-66, Jun. 2010, 17 Pages.

Mita, Takeshi, et al., "Joint Haar-like Features for Face Detection", In Tenth IEEE International Conference on Computer Vision, vol. 2, Oct. 17, 2005, pp. 1619-1626.

Li, Stan Z., et al., "Statistical Learning of Multi-View Face Detection", In Proceedings of the European Conference on Computer Vision, vol. 4, May 27, 2002, pp. 67-81.

Pavani, Sri-Kaushik, et al., "Haar-Like Features with Optimally Weighted Rectangles for Rapid Object Detection", In Journal of Pattern Recognition, vol. 43, Issue 1, Jan. 1, 2010, pp. 160-172.

Pratt, William K., "Digital Image Processing", A Wiley-Interscience Publication, Jan. 2001, p. 165.

Gonzalez, R.C., et al., "Chapter 3—Image Enhancement in the Spatial Domain", In Digital Image Processing, Jan. 1, 2001, pp. 80-102.

Viola, Paul, et al., "Robust Real-Time Face Detection", In International Journal of Computer Vision 57(2), May 2004, pp. 137-154.

Rodriguez, Yann, "Face Detection and Verification Using Local Binary Patterns", In PhD thesis, Ecole Polytechnique Federale de Lausanne, Dec. 2006, 7 pages.

Roy, Anindya, et al., "Haar Local Binary Pattern Feature for Fast Illumination Invariant Face Detection", In British Machine Vision Conference, Sep. 8, 2009, 12 pages.

* cited by examiner

REAL-TIME FACE DETECTION USING PIXEL PAIRS

BACKGROUND

Face detection algorithms have many uses and have been studied extensively. For example, most existing real-time face detection systems use Haar-wavelets as visual features, because they can be evaluated in constant time at any scale using integral images comprising a data structure that allows querying the sum of all pixel values above and to the left of any location in the input image in constant time.

However, existing Haar-wavelet-based real-time face detection algorithms need relatively powerful computing devices to provide the processing power needed for most applications. Commonly used face detection algorithms take too long on contemporary mobile device hardware, and are thus not suited for real-time processing on mobile hardware.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a face detection technology in which image data is classified as being a non-face image or a face image. In one aspect image data is processed into an image pyramid. Features of sub-window candidates are provided to each stage of a cascading classifier to remove zero or more sub-window candidates that are classified as non-face sub-windows within that stage. The features comprise pixel pairs of the image pyramid. The face detection technology continues with one or more subsequent stages to output a result as to whether the image contains a face based upon whether at least one sub-window candidate remains.

In one aspect, a memory includes instructions, corresponding to a face detector, that are executed by the processor. The face detector is configured to process image data into an image pyramid comprising representations of the image data at different resolutions, and to extract features from the image pyramid comprising pixel pairs of the image pyramid. The features are provided to a cascading classifier of the face detector, which uses the features to remove candidate sub-windows in a plurality of stages to detect whether the image data corresponds to a face or non-face image.

In one aspect, there is described processing image data corresponding to a captured image into an image pyramid, and obtaining a list of sub-window candidates. A first classifier, of a plurality of classifiers comprising a cascading classifier, is selected as a selected classifier. Feature values corresponding to pixel-pairs of one or more sub-windows in the image pyramid are provided to the selected classifier to remove any sub-window candidate from the list that does not achieve a threshold value associated with the selected classifier. Subsequent classifiers are each selected as the selected classifier, with feature values from remaining (non-removed) sub-windows provided to the selected classifier to remove any sub-window candidate from the list that does not achieve a threshold value associated with the selected classifier. When a last classifier of the cascading classifier is the selected classifier, a result is output that is indicative of whether at least one face was detected in the image data.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a face detector mechanism/algorithm that computes locations and sizes of human faces in digital images in real-time, including on a low-power device such as a mobile phone. In one aspect, multi-scale features and processing is used, using simplified image features based upon an image pyramid (in contrast to existing algorithms that avoid image pyramids and use integral images instead). As will be understood, the features described herein need very few instructions to evaluate and allow for efficient multi-scale processing.

Also described is a simplified technique that replaces conventional contrast normalization computations with effective contrast normalization, using luminance as a proxy for contrast to avoid expensive contrast computations. Further, detection at image boundaries may be achieved by increasing the face detector's field-of-view, including by padding the image at the boundaries.

It should be understood that any of the examples herein are non-limiting. For instance, instructions on a certain ARM processor are used as examples, however other processors may be used, and other devices may benefit from a similar approach. The instructions are only one efficient example. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computers and face detection in general.

Figure 1:
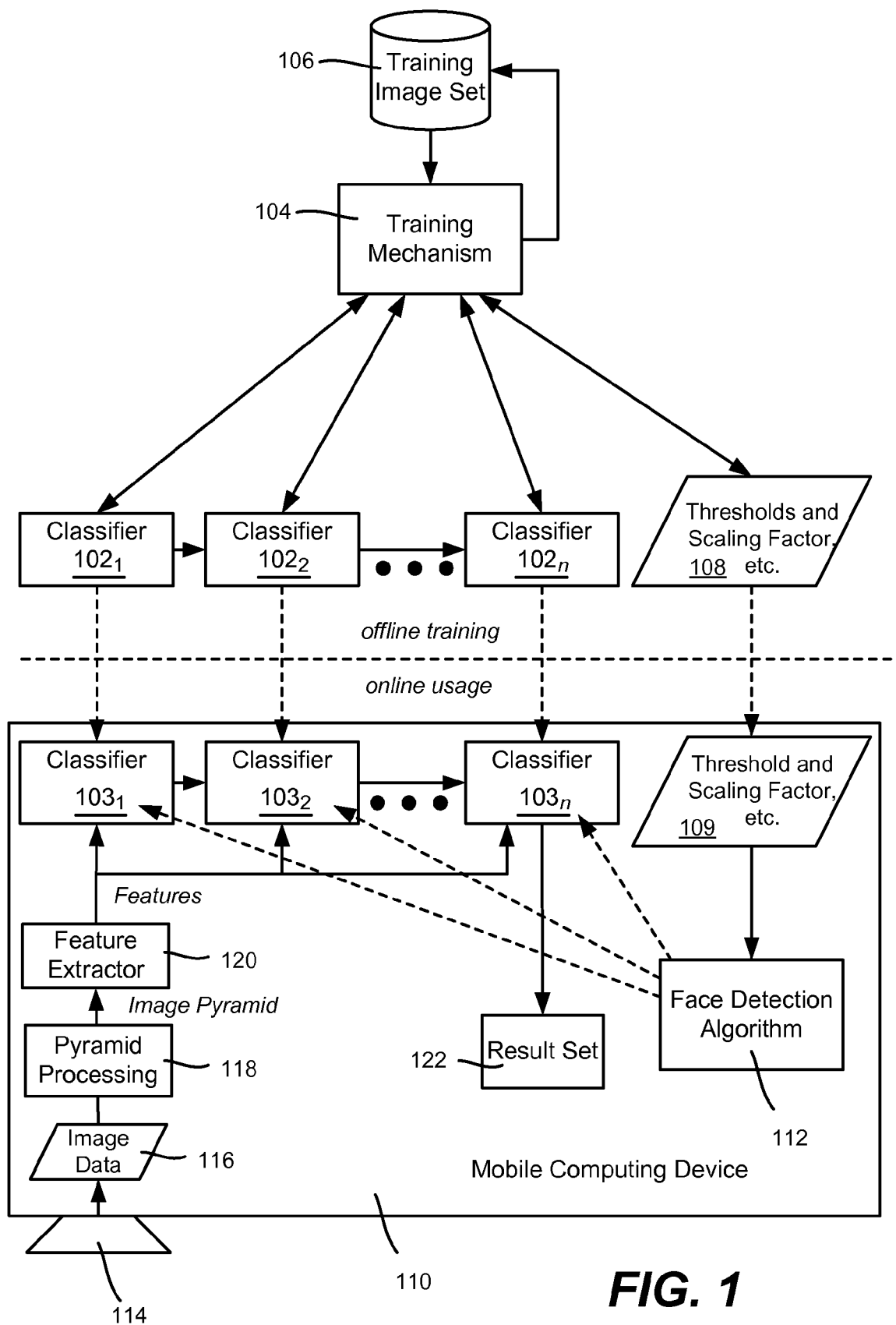
FIG. 1 is a block diagram including components configured to perform real-time face detection using pixel pairs as features provided to a cascading classifier, according to one example embodiment.

FIG. 1 shows a cascade of classifiers $102_1$-$102_n$ being trained offline by a training mechanism 104 using a set of images 106 known to contain faces and those known not to contain faces. As is known, the training mechanism 104 iteratively trains the classifiers $102_1$-$102_n$ using features extracted from the images until a sufficiently high rate of correct results is achieved; such training is generally well known and not described in detail herein. Note however that the training may be run and re-run with different data/parameters 108 such as thresholds, scaling factors and so forth to obtain desirable values for those parameters, as described below.

Face detection classifiers typically operate by scanning sub-windows in an image with a face/no-face classifier (a face "template"). To detect faces at different scales, the classifier is applied to scaled versions of the input image. In practice, high quality face/no-face classifiers are computationally too expensive to be run on every sub-window, because the number of sub-windows is very large, even at low-resolutions. Thus, existing real-time systems use a cascade of classifiers of increasing accuracy/complexity, e.g., the first classifier in the cascade is relatively crude (and thus very fast) and runs on all sub-windows, with an operating point set such that as many non-face sub-windows as possible are rejected while all face sub-windows are classified correctly (e.g., one-hundred percent recall, that is no false negatives). A second classifier is more accurate (and slower), but only runs on sub-windows that have been classified as "face" by the previous stage classifier (which includes real faces and false positives), and so on, up to a desired number of classifiers/scales. This cascading has the effect that many non-face sub-windows are rejected early, leaving the expensive full-accuracy classification to a small number of sub-window locations that very likely contain faces.

FIG. 1 also shows the online usage of instances of the trained classifiers 103$_1$-103$_n$ (referred to hereinafter as the cascading classifier 103) as loaded into a computing device 110, such as a mobile computing device. The data parameters 109 comprising the thresholds and scaling factors as well as any other variable parameters (which may be the same or different for each classifier) are incorporated into a face detection algorithm 112 that is part of each classifier. In one implementation, the face detection algorithm 112 along with the data parameters 109 are hard coded into the cascading classifier 103.

In general, when a camera 114 captures image data 116, a pyramid processing block 118 builds an image pyramid (FIG. 2) comprising the image data at different resolutions. A feature extractor 120 extracts features as described herein for processing by the classifiers into a result set 122.

Turning to the features, note that most existing real-time face detection systems use Haar-wavelets as visual features, because they can be evaluated in constant time at any scale using integral images. The sum of pixels in a rectangular area can be computed from four integral image queries (at the rectangle corners).

Figure 2:
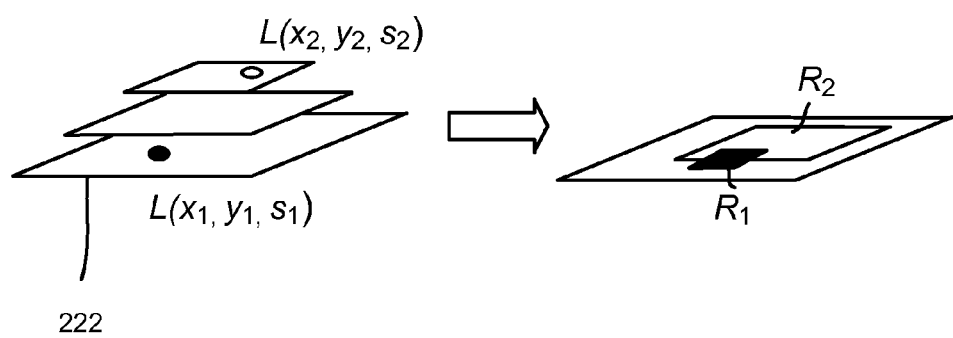
FIG. 2 is a representation of an image pyramid from which pixel pairs may be selected for use in classification, according to one example embodiment.

Described herein is an algorithm that uses a different set of features, namely differences of two pixels (pixel pairs) at different scales as illustrated in the image pyramid 222 of FIG. 2; (although other features also may be used). The pixel pair features may be expressed as:

$$f = L(x_1, y_1, s_1) - L(x_2, y_2, s_2)$$
$$= \sum \text{pixels in } R_1 - \sum \text{pixels in } R_2.$$

More particularly, pixel pair features have a similar expressive power as Haar-wavelets. Note that pixel pair features use an image pyramid, which was heretofore widely believed to be prohibitive in real-time applications. However, due to the many noise sources in a face detection system (shutter wobble, motion blur, varying exposure and illumination, and so forth), the visual quality of the image pyramid allows for very fast implementations to be used. For example, lower octaves may be computed by 2×2 averaging, and intermediate scales by nearest neighbor sampling. Such a pyramid has been found to be sufficiently accurate, and can be computed with three levels per octave in about one millisecond on a typical smartphone at 160×120 resolution.

Turning to multi-scale processing, to run the detector the cascaded classifier 103 that decides face/no-face is applied to (e.g., all) 21×21 sub-windows in the input image pyramid 222. The cascaded classifier 103 keeps a linked list of sub-window locations, which is updated by each classification stage. Before the first stage runs, the list contains (logically) all locations at all scales. The list shrinks as the cascaded classifier 103 runs and each classifier removes the locations it considers no-face. As described herein, in one implementation the features used by the classifier comprise the differences between two pixels in the pyramid 222 the given 21×21 sub-window. Note that the choice of features makes the problem explicitly multi-scale.

The individual classifiers 103$_1$-103$_n$ may be restricted to read pixels only from certain pyramid levels, that is, only features from certain pyramid levels are provided for classification. One implementation restricts the first classifier 103$_1$ in the cascaded classifier 103 to use only "big" pixels from two octaves below the base resolution, or lower. As a result, detection may be run as a 6×6 sub-window classifier (instead of 21×21) on a sixteen times smaller version of the input image (e.g. 40×30 pixels instead of 160×120). Even though 6×6 is too low a resolution to classify face/non-face windows with high accuracy, it is a reasonable approximation such that approximately eighty-five percent of non-face sub-windows are rejected after the second stage.

In one implementation, starting with the third classifier stage, pixels from one octave below base resolution are allowed. This makes the third stage an "expansion stage" that expands every detection location from previous stages to its four children in the pyramid level one octave above. The four child locations are classified and removed from the list if they are non-faces (note that expansion stages are the only stages in the cascade where the location list may grow in size). After the sixth stage, approximately ninety-nine percent of non-face sub-windows have been rejected, and the detection resolution is expanded by one more octave, this time down to the base resolution. The multi-scale approach keeps the location list very small, (approximately 10^3 for a 160×120 image), which is beneficial in terms of memory locality.

For feature evaluation, unlike Haar-wavelets, the pixel pair features need fewer operations per feature (e.g., two reads plus one integer subtraction for pixel pairs, versus typically five to ten reads and several additions for Haar-wavelets). Further, these pixel pair features allow working with single channel eight-bit images, which is not possible with integral images as they need to store sums of pixel values over large areas. By using fewer bits to represent pixel values (and classifier coefficients), code and data sizes are kept at or very near a minimum, which has a positive effect on performance and power consumption.

Another aspect is directed towards contrast normalization. The value of a Haar-wavelet or pixel pair feature is (roughly) proportional to the local RMS (root-mean-square) contrast. This is undesirable in making the face detector robust to variations in illumination, exposure, and so forth. Many existing methods therefore compute the standard deviation of the luminance values in a sub-window (equal to RMS contrast), and normalize the feature values accordingly. This can be achieved using another integral image that stores the integral values of the squared luminance values (which can be large and need even wider data types in the integral image). The integral image makes this operation efficient, but is expensive, as it requires another four reads from the "squared" integral image, plus further arithmetic instructions.

As described herein, effective contrast normalization is based on the observation that in typical camera images, low contrast is generally correlated with low luminance. Thus, if the average luminance in a sub-window falls below a threshold (e.g., determined via training), the features values are multiplied by a factor, (such as two, which needs only compare and one shift operation). This is highly efficient, yet significantly helps in detecting under-exposed faces. The threshold and scaling factor may be determined by an offline analysis of face luminance and contrast on the training image set.

Turning to one classifier architecture, similar to existing techniques, each stage in the cascade classifier 103 comprises a boosted decision stump classifier that has been learned offline from a training set of face and non-face image patches. Let k be the number of features used by a given classifier at some stage (k defines the complexity of the classifier and increases along the cascade). Each classifier is of the form:

$$c(x) = \sum_{i=1}^{k} a_i I[f_i(x) > t_i] + b_i I[f_i(x) \le t_i]$$

where x is a sub-window location, $f_i(x,y,s)$ the i-th feature evaluated at x, and l is the indicator function.

The k features $f_i$ are selected from the pool of pixel pair features during the learning process. Also, their thresholds $t_i$, and their "greater than" and "less or equal than" values, $a_i$, and $b_i$, respectively, may be learned from the training data. The classifier output, c(x), is compared against a global threshold that decides whether the sub-window at x remains in the list of candidate locations or not. The above formula makes up the innermost loop in one face detector that runs for each 21×21 sub-window up to few thousand times (the average number being much lower due to the cascading rejecting most non-face patches early on). The variables $a_i$, $b_i$, $t_i$ may be hard-coded. Also, the locations and scales of the pixel pairs in each feature $x_1$, $x_2$, $y_1$, $y_2$, $s_1$, $s_2$, (FIG. 2) may be hard-coded.

Thus, one decision stump (including feature computation and effective contrast normalization) compiles to the following ARM instructions:

ing additional stages (currently seventeen in one implementation). However, the current accuracy is sufficient for most real-time applications. At ten milliseconds per frame on the phone, the face detector runs about one-hundred times faster than the existing detectors that are in use, which enables new applications in the real-time domain, e.g. augmented reality, auto-focus/exposure/white balance, video chat overlays, and so forth. Sampling of less than all frames is possible to provide a faster average time and/or allow for additional processing.

Figure 3:
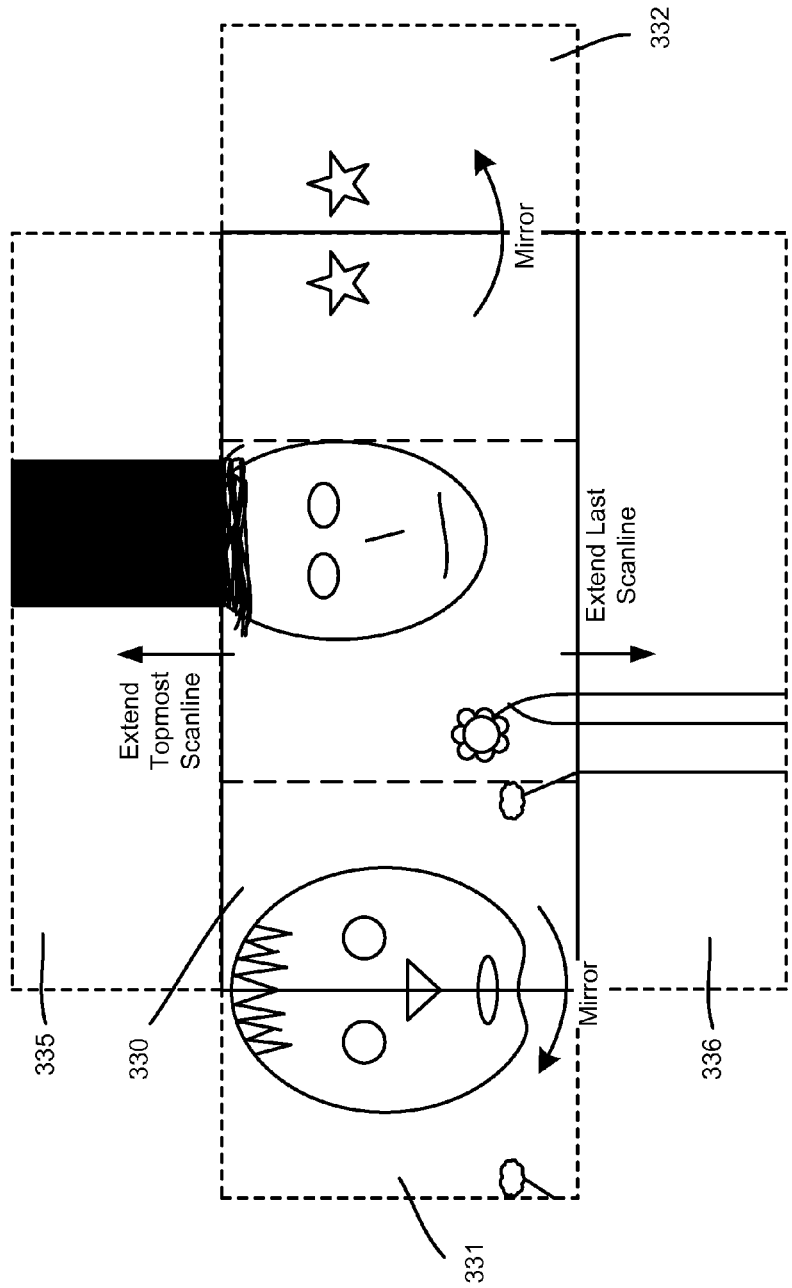
FIG. 3 is a representation of how image data may be padded to increase an effective field of view, according to one example embodiment.

The face detector provides detection for real-time applications, including low-resolution applications using a front-facing camera on a mobile device (for example, used with video chat). One problem with such scenarios is that the typical face size is on the order of the input image size itself, which means that the slightest head or camera movement moves a part of the face out of the image. As the exemplified detector uses a full 21×21 sub-window as input, such moved faces are not always detected. This is generally represented in FIG. 3, where the rectangular region 330, bounded by a solid line, represents the actual captured image.

This problem may be solved in one implementation by padding the image horizontally and vertically before running the detector. This works in part because faces are symmetrical with respect to reflection (horizontally), allowing the filling in of missing information beyond the left and right image boundaries by mirroring. The pixels in the regions (to the left and right of the imaginary dashed lines in the original image 331) may be copied and mirror-imaged into the padded regions 331 and 332, respectively (FIG. 3 is not intended to be an exact representation of any size or exact mirroring). As can be seen, this left and right padding alone makes the padded image contain what closely resembles a full face when considered with the padded region 331, but nothing that likely will be recognized as a face in the region 332. This modification significantly increases the field-of-view of the face detector.

Also, the face detector is relatively insensitive to hair/beard styles and color, allowing the filling in of missing information beyond the top and bottom image boundaries by extending the boundary pixel values. Note that faces are not vertically symmetrical, and thus a "stretching" operation may be performed. This "stretching" is generally represented in FIG. 3, and may be accomplished by extending the topmost and last

| | | | | |
|---|---|---|---|---|
| 100049E6: 7BBA r2, [r7, #0xE] | ldrb | | | Read 8 bit luminance pixel at (x2, y2, s2), register r7 holds the precomputed offset into the image row y2 at scale s2 |
| 100049E8: 7B6B r3, [r5, #0xD] | ldrb | | | Read 8 bit luminance pixel at (x1, y1, s1), register r5 holds the precomputed offset into the image row y1 at scale s1 |
| 100049EA: 1A9B | subs | r3, r3, r2 | | Compute difference between luminances |
| 100049EC: FA13 F30E | lsls | r3, r3, lr | | Apply contrast normalization by Left-shifting feature value. Register lr is either 1 (if sub-window has low mean luminance) or 0. |
| 100049F0: 2B28 | cmp | r3, #0x28 | | Test against threshold t |
| 100049F2: DC01 | bgt | 100049F8 | | Depending on the threshold test, |
| 100049F4: 2317 | movs | r3, #0x17 | | accumulate either a or b into the |
| 100049F6: E001 | b | 100049FC | | classifier output |
| 100049F8: F06F 03A0 | mvn | r3, #0xA0 | | |

Inlining the coordinates and thresholds as shown above way results in significantly faster code execution compared to reading these values from a data structure. Such a face detector runs in ten milliseconds on contemporary smartphone hardware. The detection accuracy may be improved by adding scanlines, providing padded regions 335 and 336, respectively. Note that rather than stretch the hair, a certain line (or lines) of pixels such as corresponding to the forehead and chin may be stretched. This modification also significantly increases the field-of-view of the face detector.

Figure 4:
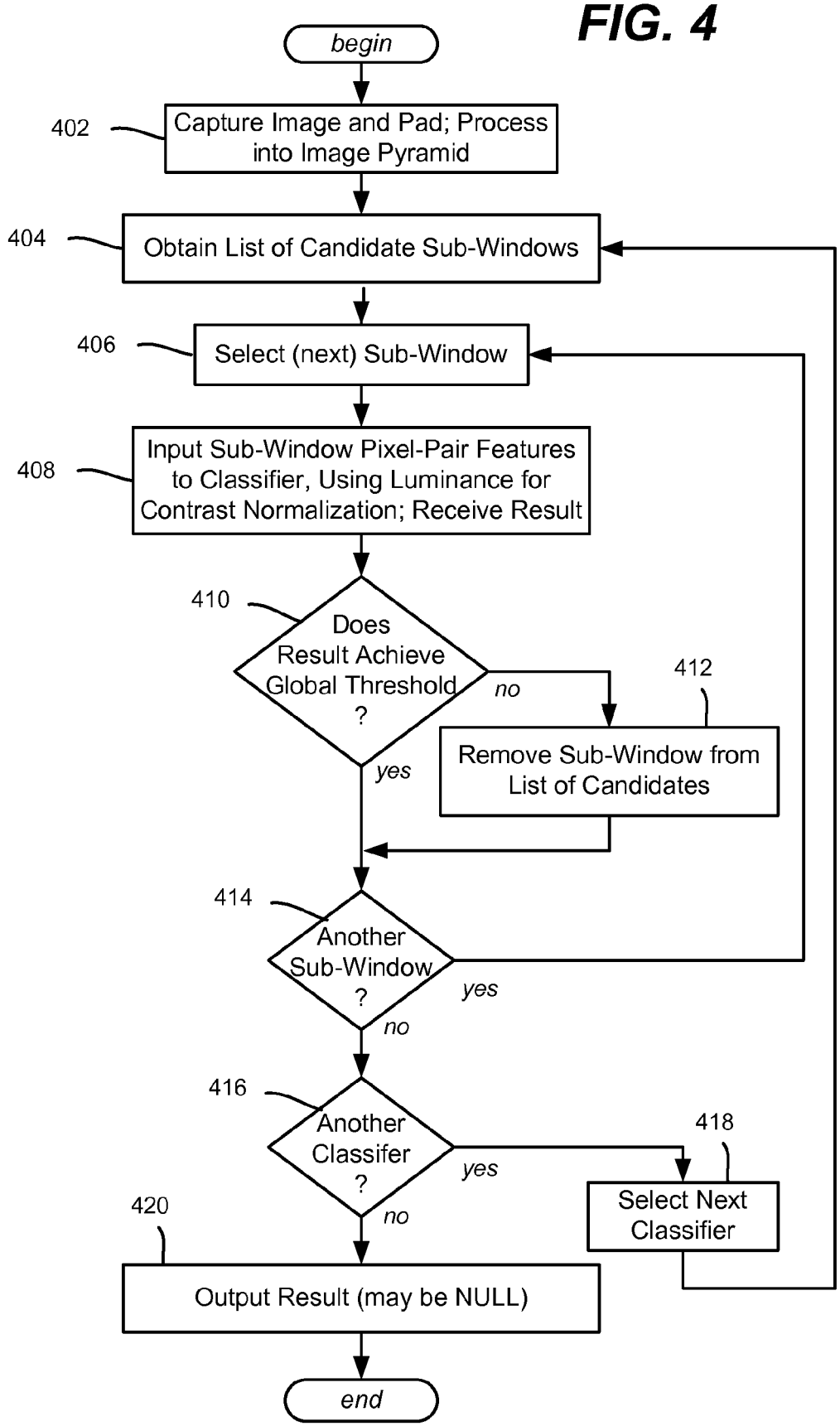
FIG. 4 is a flow diagram representing example steps that may be taken to classify image data as a non-face image or a face image, according to one example embodiment.

FIG. 4 summarizes various steps of one face detector comprising cascading classifiers, beginning at step 402 where the image is captured and any desired padding performed; the (possibly padded) image is then processed into an image pyramid having a desired number of scales. Step 404 represents obtaining a desired list of candidate sub-windows, which is initially all sub-windows, and step 406 selects a sub-window to process. As described above, the list is reduced in each cascading stage.

Step 408 represents inputting sub-window pixel pair features into the classifier as described above, which is initially the first classifier. Luminance may be used for contrast normalization as also described above. The result of the classification, c(x), is evaluated at step 410 against a global threshold that removes the sub-window from the list of candidates if not met (step 412), or allows the sub-window to remain in the list of candidates. Note that it is feasible to have a different global threshold value associated with each classifier. Further note that although not explicitly shown in FIG. 4, it is understood that the list may be evaluated at any appropriate time (e.g., following step 412) to determine if no candidates remain, and thereby short circuit any further classification stages and output a "no-face detected" result.

Step 414 repeats the process for each remaining candidate sub-window. When none remain to be processed by this stage's classifier (step 416), the next classifier is selected at step 418 and the process repeated, with finer resolution data to process but a typically smaller candidate list of sub-windows.

The output of the last classifier is generally a face or no face result based upon whether the list is empty. It is feasible, however, for more than one face to be present in an image, in which event further processing may be done on the list to determine distinct face locations.

Example Operating Environment

Figure 5:
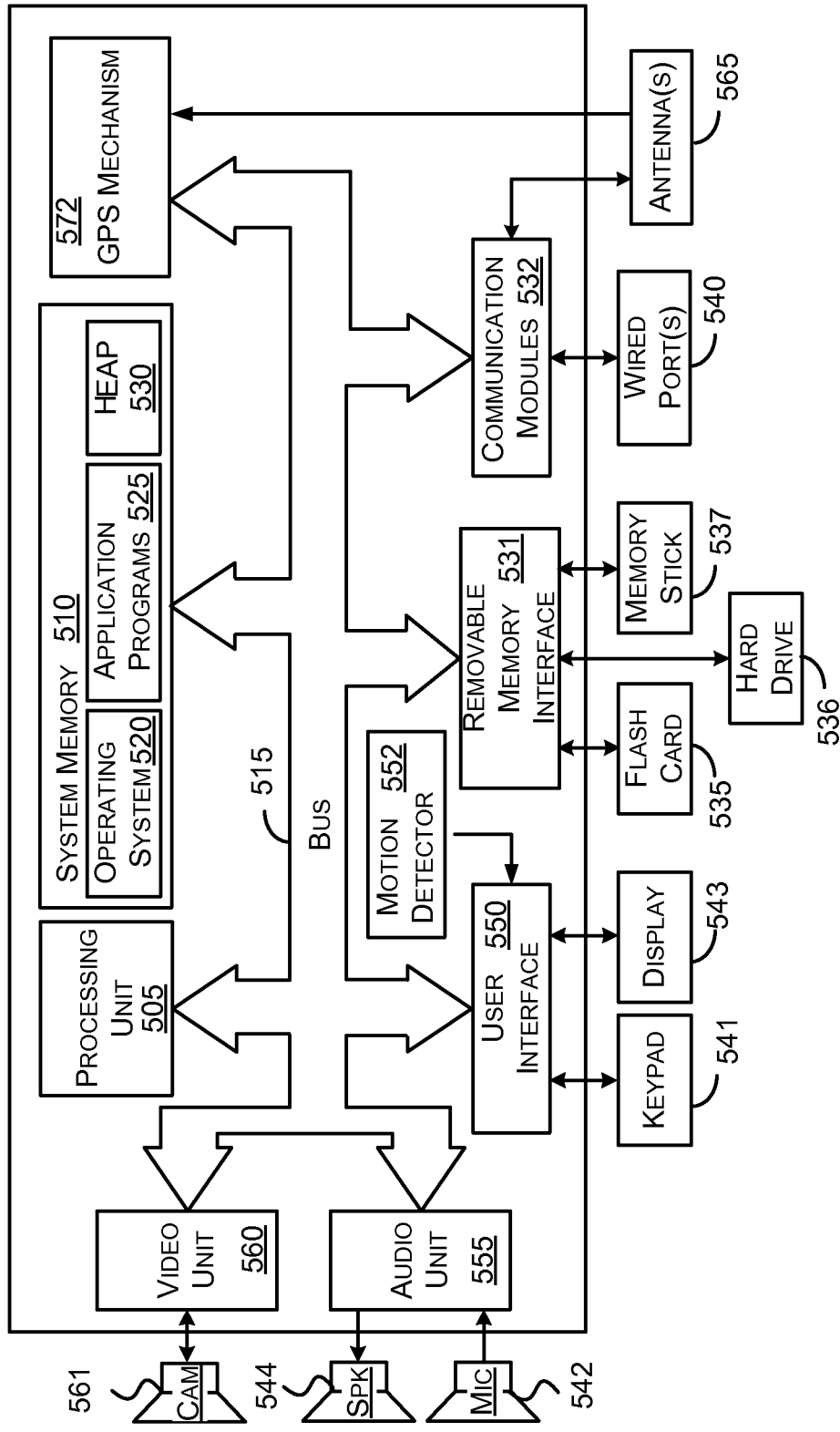
FIG. 5 is a block diagram representing an example computing environment, in the example of a mobile computing device, into which aspects of the subject matter described herein may be incorporated.

FIG. 5 illustrates an example of a suitable mobile device 500 on which aspects of the subject matter described herein may be implemented. The mobile device 500 is only one example of a device and is not intended to suggest any limitation as to the scope of use or functionality of aspects of the subject matter described herein. Neither should the mobile device 500 be interpreted as having any dependency or requirement relating to any one or combination of components illustrated in the example mobile device 500.

With reference to FIG. 5, an example device for implementing aspects of the subject matter described herein includes a mobile device 500. In some embodiments, the mobile device 500 comprises a cell phone, a handheld device that allows voice communications with others, some other voice communications device, or the like. In these embodiments, the mobile device 500 may be equipped with a camera for taking pictures, although this may not be required in other embodiments. In other embodiments, the mobile device 500 may comprise a personal digital assistant (PDA), hand-held gaming device, notebook computer, printer, appliance including a set-top, media center, or other appliance, other mobile devices, or the like. In yet other embodiments, the mobile device 500 may comprise devices that are generally considered non-mobile such as personal computers, servers, or the like.

Components of the mobile device 500 may include, but are not limited to, a processing unit 505, system memory 510, and a bus 515 that couples various system components including the system memory 510 to the processing unit 505. The bus 515 may include any of several types of bus structures including a memory bus, memory controller, a peripheral bus, and a local bus using any of a variety of bus architectures, and the like. The bus 515 allows data to be transmitted between various components of the mobile device 500.

The mobile device 500 may include a variety of computer-readable media. Computer-readable media can be any available media that can be accessed by the mobile device 500 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 500.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, Wi-Fi, WiMAX, and other wireless media. Combinations of any of the above should also be included within the scope of computer-readable media.

The system memory 510 includes computer storage media in the form of volatile and/or nonvolatile memory and may include read only memory (ROM) and random access memory (RAM). On a mobile device such as a cell phone, operating system code 520 is sometimes included in ROM although, in other embodiments, this is not required. Similarly, application programs 525 are often placed in RAM although again, in other embodiments, application programs may be placed in ROM or in other computer-readable memory. The heap 530 provides memory for state associated with the operating system 520 and the application programs 525. For example, the operating system 520 and application programs 525 may store variables and data structures in the heap 530 during their operations.

The mobile device 500 may also include other removable/non-removable, volatile/nonvolatile memory. By way of example, FIG. 5 illustrates a flash card 535, a hard disk drive 536, and a memory stick 537. The hard disk drive 536 may be miniaturized to fit in a memory slot, for example. The mobile device 500 may interface with these types of non-volatile removable memory via a removable memory interface 531, or may be connected via a universal serial bus (USB), IEEE 5394, one or more of the wired port(s) 540, or antenna(s) 565. In these embodiments, the removable memory devices 535-537 may interface with the mobile device via the communications module(s) 532. In some embodiments, not all of these types of memory may be included on a single mobile device. In other embodiments, one or more of these and other types of removable memory may be included on a single mobile device.

In some embodiments, the hard disk drive 536 may be connected in such a way as to be more permanently attached to the mobile device 500. For example, the hard disk drive 536 may be connected to an interface such as parallel advanced technology attachment (PATA), serial advanced technology attachment (SATA) or otherwise, which may be connected to the bus 515. In such embodiments, removing the hard drive may involve removing a cover of the mobile device 500 and removing screws or other fasteners that connect the hard drive 536 to support structures within the mobile device 500.

The removable memory devices 535-537 and their associated computer storage media, discussed above and illustrated in FIG. 5, provide storage of computer-readable instructions, program modules, data structures, and other data for the mobile device 500. For example, the removable memory device or devices 535-537 may store images taken by the mobile device 500, voice recordings, contact information, programs, data for the programs and so forth.

A user may enter commands and information into the mobile device 500 through input devices such as a key pad 541 and the microphone 542. In some embodiments, the display 543 may be touch-sensitive screen and may allow a user to enter commands and information thereon. The key pad 541 and display 543 may be connected to the processing unit 505 through a user input interface 550 that is coupled to the bus 515, but may also be connected by other interface and bus structures, such as the communications module(s) 532 and wired port(s) 540. Motion detection 552 can be used to determine gestures made with the device 500.

A user may communicate with other users via speaking into the microphone 542 and via text messages that are entered on the key pad 541 or a touch sensitive display 543, for example. The audio unit 555 may provide electrical signals to drive the speaker 544 as well as receive and digitize audio signals received from the microphone 542.

The mobile device 500 may include a video unit 560 that provides signals to drive a camera 561. The video unit 560 may also receive images obtained by the camera 561 and provide these images to the processing unit 505 and/or memory included on the mobile device 500. The images obtained by the camera 561 may comprise video, one or more images that do not form a video, or some combination thereof.

The communication module(s) 532 may provide signals to and receive signals from one or more antenna(s) 565. One of the antenna(s) 565 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 572. In turn, the GPS mechanism 572 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 500 may connect to one or more remote devices. The remote devices may include a personal computer, a server, a router, a network PC, a cell phone, a media playback device, a peer device or other common network node, and typically includes many or all of the elements described above relative to the mobile device 500.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
processing image data into an image pyramid;
providing features of sub-window candidates to each stage of a cascading classifier to remove zero or more sub-window candidates that are classified as non-face sub-windows within that stage, in which the features comprise pixel pairs of the image pyramid;
continuing with one or more subsequent stages; and
outputting a result based upon whether at least one sub-window candidate remains.

2. The method of claim 1 further comprising:
using luminance data to perform contrast normalization.

3. The method of claim 1 further comprising:
using luminance data in at least one classifier to perform contrast normalization.

4. The method of claim 1 further comprising:
padding a captured image in at least one direction into the image data that is processed into the image pyramid.

5. The method of claim 4 wherein padding the captured image comprises padding the captured image horizontally in a region based upon pixel data mirrored from an opposite region.

6. The method of claim 4 wherein padding the captured image comprises stretching the captured image vertically in a least one direction.

7. The method of claim 1 wherein continuing with the one or more subsequent stages ends at a last classifier, and wherein outputting the result comprises outputting a result indicating that a face was detected if at least one sub-window candidate remains.

8. The method of claim 1 wherein continuing with the one or more subsequent stages ends if no sub-window candidate remains, and wherein outputting the result comprises outputting a result indicating that no face was detected.

9. The method of claim 1 further comprising:
using learned pixel-pair coordinates in at least one classifier.

10. The method of claim 1 further comprising:
using at last one learned threshold value in at least one classifier.

11. The method of claim 1 further comprising:
removing a sub-window candidate when combined differences of pixel pairs of that sub-window fail to achieve a global threshold value.

12. The method of claim 9 further comprising:
learning the global threshold value.

13. The method of claim 1 wherein providing the features of the sub-window candidates to each stage of a cascading classifier comprises restricting the features provided to at least one stage to only features from certain pyramid levels.

14. A system comprising:
at least one processor; and
memory coupled to the at least one processor, the memory including instructions, corresponding to a face detector, that are executed by the at least one processor, the face detector configured to process image data into an image pyramid comprising representations of the image data at different resolutions, to extract features from the image pyramid comprising pixel pairs of the image pyramid, and to provide the features to a cascading classifier of the face detector, the cascading classifier configured to use the features to identify non-face sub-windows and remove candidate sub-windows classified as the non-face sub-windows in a plurality of stages to detect whether the image data corresponds to a face or non-face image.

15. The system of claim 14 wherein at least one stage of the cascading classifier performs contrast normalization based upon a luminance value representative of a luminance of a sub-window versus a threshold luminance.

16. The system of claim 14 wherein the face detector is further configured to pad a captured image in at least one direction into the image data that is processed into the image pyramid.

17. One or more computer-readable media having computer-executable instructions, which when executed by a computer, cause the computer to perform steps, comprising,
(a) processing image data corresponding to the image into an image pyramid;
(b) obtaining a list of sub-window candidates;
(c) selecting a first classifier, of a plurality of classifiers comprising a cascading classifier, as a selected classifier;
(d) providing feature values corresponding to pixel-pairs of one or more sub-windows in the image pyramid to the selected classifier to remove any sub-window candidate from the list that does not achieve a threshold value associated with the selected classifier;
(e) determining whether a last classifier of the cascading classifier is the selected classifier, and if so, advancing to step (g);
(f) selecting a subsequent classifier of the cascading classifier as a selected classifier and returning to step (d);
(g) outputting a result indicative of whether at least one face was detected in the image data.

18. The one or more computer-readable media of claim 17 having further computer executable instructions comprising:
padding the captured image in at least one direction to provide the image data.

19. The one or more computer-readable media of claim 17 having further computer executable instructions comprising:
using luminance data associated with at least one sub-window for contrast normalization.

20. The one or more computer-readable media of claim 17 having further computer executable instructions comprising:
repeating steps (a) through (g) for each of a plurality of frames of images.

* * * * *